(12) United States Patent
Banerjee et al.

(10) Patent No.: US 9,085,477 B2
(45) Date of Patent: Jul. 21, 2015

(54) PROCESS FOR REDUCING THE SULFATE CONCENTRATION IN A WASTEWATER STREAM

(75) Inventors: Kashi Banerjee, Moon Township, PA (US); Charles D. Blumenschein, Pittsburgh, PA (US); Robert G. Cook, Montgomery, TX (US); John C. Schrader, Pittsburgh, PA (US)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 923 days.

(21) Appl. No.: 13/166,928

(22) Filed: Jun. 23, 2011

(65) Prior Publication Data

US 2012/0160770 A1   Jun. 28, 2012

Related U.S. Application Data

(60) Provisional application No. 61/357,591, filed on Jun. 23, 2010.

(51) Int. Cl.
*B01D 21/00* (2006.01)
*C02F 1/52* (2006.01)
(Continued)

(52) U.S. Cl.
CPC ............... *C02F 1/5245* (2013.01); *C02F 1/44* (2013.01); *C02F 1/66* (2013.01); *C02F 5/06* (2013.01);
(Continued)

(58) Field of Classification Search
CPC .......... C02F 1/281; C02F 1/5245; C02F 1/62; C02F 1/58; C02F 1/52; C02F 1/463; C02F 5/08; C02F 9/00; C02F 11/12; C02F 2001/00; C02F 2001/007; C02F 2001/52; C02F 2209/19; C02F 2101/101; C02F 2201/007; C02F 2201/002; C02F 2301/04; C02F 2301/046; C02F 2301/08; B01D 36/04; B01D 36/008; B01D 36/02; B01D 21/00; B01D 21/003; B01D 21/0012; B01D 21/0084; B01D 21/01; B01D 21/10; B01D 21/34; B01D 37/03; B01D 2317/022; B01D 2317/025; B01D 2317/08; B01D 21/0042; B01D 21/0045; B01D 21/0048; B01D 21/0051; B01D 21/0054; B01D 21/006; B01D 21/0063; B01D 21/0066; B01D 21/0069; B01D 21/0072; B01D 21/0075; B01D 21/0078; B01D 21/0081; B01D 21/0087; B01D 21/009; B01D 21/02; B01D 21/04; B01D 21/06; B01D 21/08; B01D 21/12; B01D 21/14; B01D 21/24; B01D 21/245
USPC ........................................................ 210/803
See application file for complete search history.

(56) References Cited

U.S. PATENT DOCUMENTS 3,252,897 A     5/1966  Hesler et al.
3,959,133 A  *  5/1976  Fulton ........................... 210/711

(Continued)

FOREIGN PATENT DOCUMENTS

CN     1466552 A     1/2004
CN     2725282 Y     9/2005

(Continued)

OTHER PUBLICATIONS

Geldenhuys et al., (2003, The Journal of the South African Institute of Mining and Metallurgy, Jul./Aug., pp. 345-354).*

(Continued)

*Primary Examiner* — Allison Fitzsimmons
(74) *Attorney, Agent, or Firm* — Coats and Bennett PLLC

(57) ABSTRACT

A method of reducing a sulfate concentration in wastewater comprises directing the wastewater stream to a precipitation reactor and mixing the wastewater stream with a calcium source and a calcium salt seed material to precipitate calcium sulfate. The precipitated calcium sulfate is then separated from a treated effluent and directed to a settling tank where the precipitated calcium sulfate is separated into heavier calcium sulfate precipitants and lighter calcium sulfate precipitants. The heavier calcium sulfate precipitants and the lighter calcium sulfate precipitants are separately recirculated to the precipitation reactor. A predetermined mass ratio of solids is maintained in the precipitation reactor.

18 Claims, 3 Drawing Sheets

(51) Int. Cl.
*B01D 11/02* (2006.01)
*C02F 1/44* (2006.01)
*C02F 101/10* (2006.01)
*C02F 103/10* (2006.01)
*C02F 103/16* (2006.01)
*C02F 103/36* (2006.01)
*C02F 1/66* (2006.01)
*C02F 5/06* (2006.01)

(52) U.S. Cl.
CPC ....... *C02F 2101/101* (2013.01); *C02F 2101/40* (2013.01); *C02F 2103/10* (2013.01); *C02F 2103/16* (2013.01); *C02F 2103/365* (2013.01); *C02F 2301/046* (2013.01); *C02F 2303/22* (2013.01); *C02F 2305/12* (2013.01)

(56) References Cited

U.S. PATENT DOCUMENTS

| | | |
|---|---|---|
| 4,246,241 A | 1/1981 | Mathur et al. |
| 4,519,912 A | 5/1985 | Kauffman et al. |
| 4,563,285 A * | 1/1986 | Nair et al. ............... 210/714 |
| 4,636,376 A | 1/1987 | Maloney et al. |
| 5,035,807 A | 7/1991 | Maree |
| 5,108,722 A | 4/1992 | Ruthel et al. |
| 5,178,773 A * | 1/1993 | Kerlin et al. ............ 210/724 |
| 5,536,415 A | 7/1996 | Joubert |
| 5,547,588 A * | 8/1996 | Hassett et al. .......... 210/724 |
| 6,280,630 B1 | 8/2001 | Ramsay |
| 6,863,819 B2 | 3/2005 | Maree |
| 2008/0121585 A1* | 5/2008 | Mavis ..................... 210/652 |
| 2011/0163032 A1 | 7/2011 | Alexander |

FOREIGN PATENT DOCUMENTS

| | | |
|---|---|---|
| EP | 0922678 A1 * | 6/1999 |
| WO | 0134524 A1 | 5/2001 |
| WO | 2004103918 A1 | 12/2004 |

OTHER PUBLICATIONS

CN Search Report issued Mar. 10, 2014 in re CN Application No. 201180030387.X filed Dec. 20, 2012.

* cited by examiner

PROCESS FOR REDUCING THE SULFATE CONCENTRATION IN A WASTEWATER STREAM

FIELD OF INVENTION

The present invention relates to a process for reducing sulfate concentration in a water stream, and more particularly relates to reducing sulfate concentration in a nanofiltration or reverse osmosis membrane separation reject stream prior to discharging or recycling of such streams.

BACKGROUND

Industrial wastewater generated at steel, mining, plating, oil production and refining operation, and microelectronic industries generally contains high concentrations of sulfate and other contaminants. The promulgation of new regulations often limits the amount of sulfate that can be present in wastewater discharged because of the effects on the environment. Furthermore, wastewater that is not discharged into the environment, but that is reused in other applications, must often be treated to reduce high concentrations of sulfate. Elevated concentrations of sulfate promote scaling on wastewater treatment equipment, reduce the quality of drinking water, and affect the environment. For example, high sulfate concentrations in water can cause the water to have a foul taste and can have a laxative effect in humans and animals. As another example, sulfates are a major dissolved component in rain and can be chemically reduced to form sulfides, which are known to corrode many metals.

Some methods for sulfate removal may not be environmentally friendly, require the use of more chemicals, and may be costly and thus not the most efficient. Processes utilizing barium sulfide require the use of carbon dioxide, which attributes to the greenhouse effect, include sulfides that must be stripped to prevent corrosion of metals, and must conform to regulations regarding barium discharge which can be poisonous and explosive. The use of biological methods may provide difficulties in maintaining optimum, stabilized conditions for bacterial viability. They also result in the production of sulfides that are difficult to remove and metabolic waste which contributes to pollution. Thus, the process disclosed herein may be considered more environmentally friendly and efficient by utilizing a method that only requires calcium and calcium salts.

SUMMARY OF THE INVENTION

The present invention is directed to a method of reducing a sulfate concentration in wastewater. The method comprises directing a wastewater stream having a sulfate concentration to a precipitation reactor and mixing the wastewater stream with a calcium source and a calcium salt seed material in the precipitation reactor to precipitate calcium sulfate. Sulfate ions in the wastewater stream are adsorbed onto the precipitated calcium sulfate and onto the calcium salt seed material. The wastewater stream containing the precipitated calcium sulfate is directed to a separator where the precipitated calcium sulfate is separated from a treated effluent. The precipitated calcium sulfate is then directed to a settling tank and recirculated to the precipitation reactor.

In another embodiment, the precipitated calcium sulfate is then directed to a settling tank where the heavier calcium sulfate precipitants having a larger particle diameter settle to the bottom of the settling tank and the lighter calcium sulfate precipitants having a smaller particle diameter settle to an intermediate portion of the settling tank. The heavier calcium sulfate precipitants and the lighter calcium sulfate precipitants are separately recirculated to the precipitation reactor.

In yet another embodiment, a predetermined mass ratio of solids is maintained in the precipitation reactor. The predetermined mass ratio of the weight of the recirculated precipitated calcium sulfate disposed in the precipitation reactor to the weight of newly precipitated calcium sulfate in the treated water stream disposed in the precipitation reactor.

Those skilled in the art will recognize additional features and advantages upon reading the following detailed description, and upon viewing the accompanying drawings.

DESCRIPTION OF EXEMPLARY EMBODIMENTS

Figure 1:
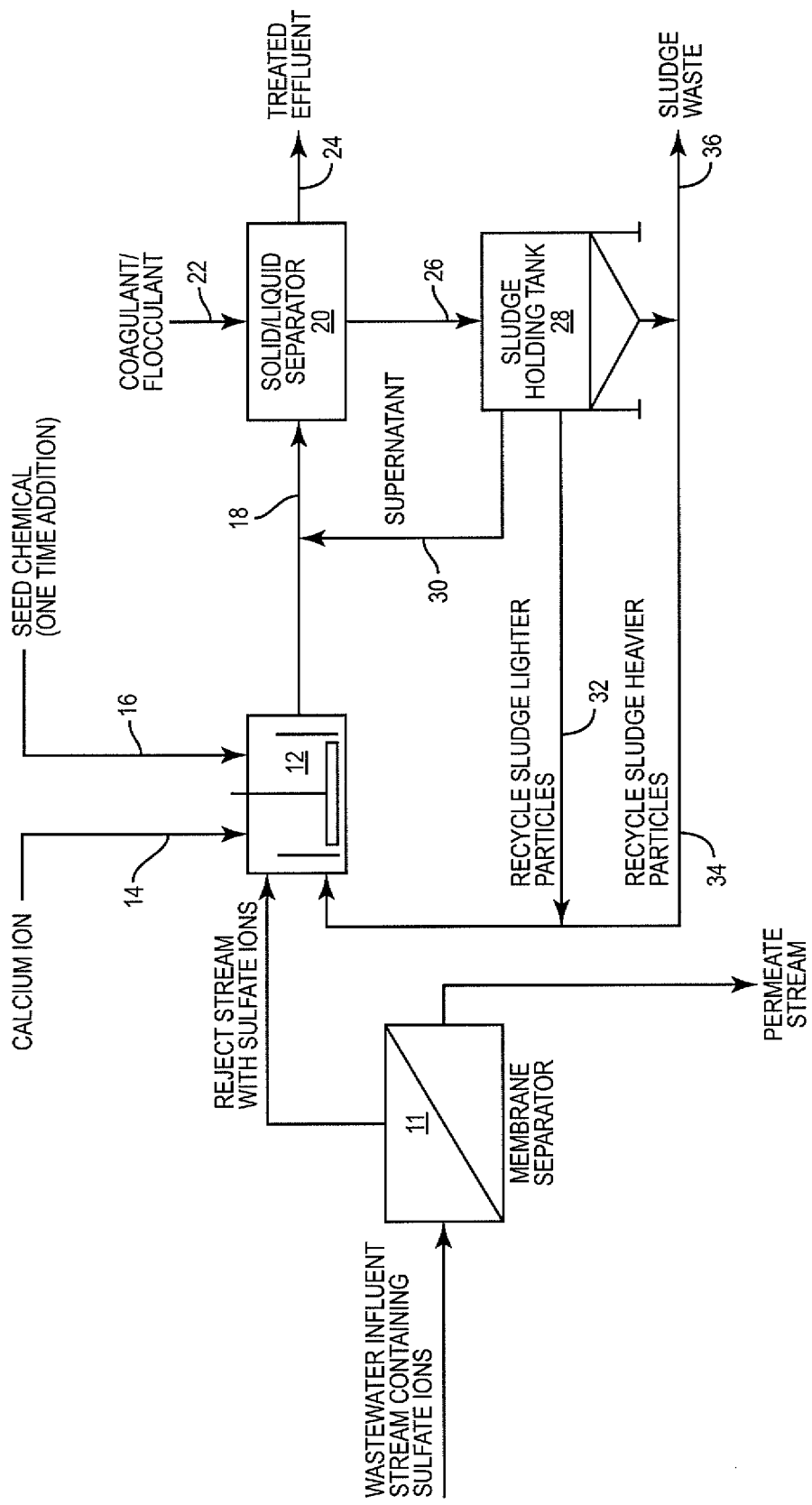
FIG. 1 is a schematic illustrating one embodiment of the present invention.

A system for reducing sulfate concentration from a water stream is generally indicated by the numeral 10 in FIG. 1. While the method of the present invention may be used for treating any water stream having an elevated sulfate concentration, the embodiment illustrated in FIG. 1 is particularly suited for reducing the sulfate concentration in a membrane separation reject stream having a high sulfate concentration. For example, during typical wastewater treatment processes, the wastewater is exposed to a membrane, such as a nanofiltration membrane or a reverse osmosis membrane. Nanofiltration is a cross-flow separation method where the feed stream flows tangentially to the membrane, which allows pure solvent to flow through as permeate. During reverse osmosis, pressure greater than the osmotic pressure is applied on the side of the membrane containing solute, which allows pure solvent to flow through as permeate. In each method of separation, the membrane permeate stream has a reduced sulfate concentration, while the membrane reject stream has an elevated sulfate concentration. Often the reject stream has a sulfate concentration 2 to 10 times greater than the sulfate concentration in the influent wastewater prior to membrane treatment.

Before the membrane reject stream can be reused or discharged, the sulfate concentration must be reduced. In conventional processes, the sulfate concentration in the membrane reject stream is reduced through a chemical precipitation process. For example, a calcium source is added to the membrane reject stream so that the calcium ions react with the sulfate ions in the reject stream to produce calcium sulfate precipitants. However, many water treatment methods involve the use of antiscalants that interfere with precipitation in order to reduce scaling on treatment equipment and prevent membranes from becoming plugged with scale deposits. Even without the presence of antiscalants, calcium sulfate remains dissolved in solution and only precipitates when the concentration of the calcium sulfate exceeds 140% of the theoretical saturation value. For example, the theoretical saturation value of calcium sulfate at 30° C. and in a 0.01 M solution is approximately 2000 mg/L. However, in practice, calcium sulfate remains dissolved in solution up to a concentration of approximately 2800 mg/L. Ionic strength is also a major concern in wastewater treatment. Wastewater generally contains many ionic compounds that dissociate in water. Increasing the ionic strength of a calcium sulfate solution also increases the solubility of the calcium sulfate in the solution. For example, an increase in ionic strength from 0.01M to 1.0M will increase the theoretical solubility of calcium sulfate by more than 2 fold. Thus, calcium sulfate solutions having a high ionic strength may not readily form calcium sulfate precipitants. Accordingly, simply adding a calcium source to a solution containing sulfate ions and having a high ionic strength, does not form a large quantity of calcium sulfate precipitants in the wastewater.

As shown in FIG. 1, a system for reducing sulfate concentration in a wastewater stream is generally indicated by numeral 10. A wastewater stream having dissolved sulfate ions is first directed through a membrane separator 11 which produces a permeate stream and a membrane reject stream containing the dissolved sulfate ions. The membrane reject stream is directed from the membrane separator 11 to reactor 12 having a high-speed mixer. However, any wastewater stream having a sulfate concentration may be treated in the system described herein. In one embodiment, the reactor is the Veolia Water proprietary TURBOMIX reactor, which comprises a vertical tube having a mixer therein. In other embodiments, the reactor is a conventional reactor such as a completely mixed reactor or a continuous flow stirred tank reactor. The membrane reject stream or wastewater stream having a sulfate concentration is mixed in reactor 12 with a calcium ion source and a seed material. The calcium ion source is typically lime, calcium chloride, or a combination thereof, and is added to the membrane reject stream in reactor 12 through inlet 14. As discussed above, the addition of a calcium source to the wastewater containing sulfate ions promotes the precipitation of calcium sulfate. The seed material is added to the reactor 12 through inlet 16 and is typically calcium sulfate hemihydrates, but can be any insoluble calcium salt. Generally, the seed material is only added once to the wastewater in the reactor 12.

The seed material has a highly reactive surface which increases the reaction driving force and the available free energy of the system. The reactive surface of the seed material drives the calcium sulfate formation reaction in the membrane reject stream. Sulfate ions in the wastewater in reactor 12 are adsorbed onto the reactive surface of the seed material and adsorbed onto the reactive surface of newly precipitated calcium sulfate solids. Accordingly, the addition of a seed material allows for increased precipitation of calcium sulfate in the wastewater. As discussed herein, the concentration of dissolved calcium sulfate in the treated wastewater is typically reduced to a value close to its saturation value.

The treated wastewater in reactor 12, which contains precipitated calcium sulfate, is directed from reactor 12 to a solid/liquid separator 20 through line 18. In one embodiment, the solid/liquid separator is the Veolia Water proprietary MULTIFLO system. In other embodiments, the solid/liquid separator is a conventional clarifier or a membrane separation unit. The solid/liquid separator 20 separates the calcium sulfate precipitants from a treated effluent. In the embodiment shown in FIG. 1, a coagulant and/or flocculant are added to the treated water in the solid/liquid separator 20 through inlet 22. The coagulant and/or flocculant promote(s) the agglomeration and settling of the solids in the treated wastewater. Precipitated calcium sulfate solids in the solid/liquid separator 20 form sludge that settles to the bottom of the tank. Treated effluent is directed from an upper portion of the solid/liquid separator 20 and exits the solid/liquid separator through line 24. The sludge is directed from the bottom of the solid/liquid separator 20 through line 26 to a sludge holding tank 28 for further settling. Heavier calcium sulfate precipitants, having a larger particle diameter, settle at the bottom of the sludge holding tank 28. Lighter calcium sulfate precipitants, having a smaller diameter and a higher surface area, are disposed in an intermediate portion of the sludge holding tank 28. An aqueous supernatant, containing little or no suspended calcium sulfate, is formed in the upper portion of the sludge holding tank 28.

The aqueous supernatant, disposed in the upper portion of the sludge holding tank 28, is recycled from the sludge holding tank to the solid/liquid separator 20 through line 30. This allows any remaining suspended solids in the supernatant to be further exposed to a coagulant and/or flocculant so that the remaining suspended solids can be removed from the system 10 as treated effluent. A portion of the lighter calcium sulfate precipitants is recycled from the sludge holding tank 28 to reactor 12 through line 32, while a portion of the heavier calcium sulfate precipitants is recycled from the sludge holding tank 28 to the reactor 12 through line 34. Further, some of the heavier calcium sulfate precipitants may be wasted through line 36 for dewatering prior to off site disposal. Both the lighter and heavier calcium sulfate precipitants are recycled to reactor 12 to maintain a predetermined mass ratio of solids in the reactor 12. As used in the context of reactor 12, the mass ratio is the weight of the calcium sulfate solids generated from the recycled sludge compared to the weight of the newly precipitated calcium sulfate solids generated in the wastewater during the precipitation reaction. Typically the mass ratio is between 5:1 and 30:1.

The mass ratio can be adjusted to account for constantly changing variables in the process such as the feed water quality, the effluent water quality, temperature, ionic strength, sulfate concentration, and calcium sulfate precipitation. Recycled calcium sulfate precipitants provide additional reactive surfaces which increase the free energy of the system and provide a continued driving force for calcium sulfate precipitation reaction in the reactor 12. Sulfate ions in the wastewater and newly formed calcium sulfate precipitants adsorb onto the reactive surfaces of the recycled calcium sulfate. Accordingly, utilizing the recycled calcium sulfate solids in the process decreases the need for additional raw materials, such as additional seed material and thus, increases the efficiency of the process and reduces the costs associated with process.

An option to the above indicated recycle step is to pump the sludge from the bottom of the sludge holding tank 28 through line 34 to a hydrocyclone. The hydrocyclone is designed to separate the larger and smaller particles into two streams. The larger size particles typically report to the bottom the hydrocyclone and the smaller particles report to the top of the hydrocyclone. This separation of the particles permits greater individual control and flexibility of the return of the smaller and larger particles to reactor 12.

Figure 2:
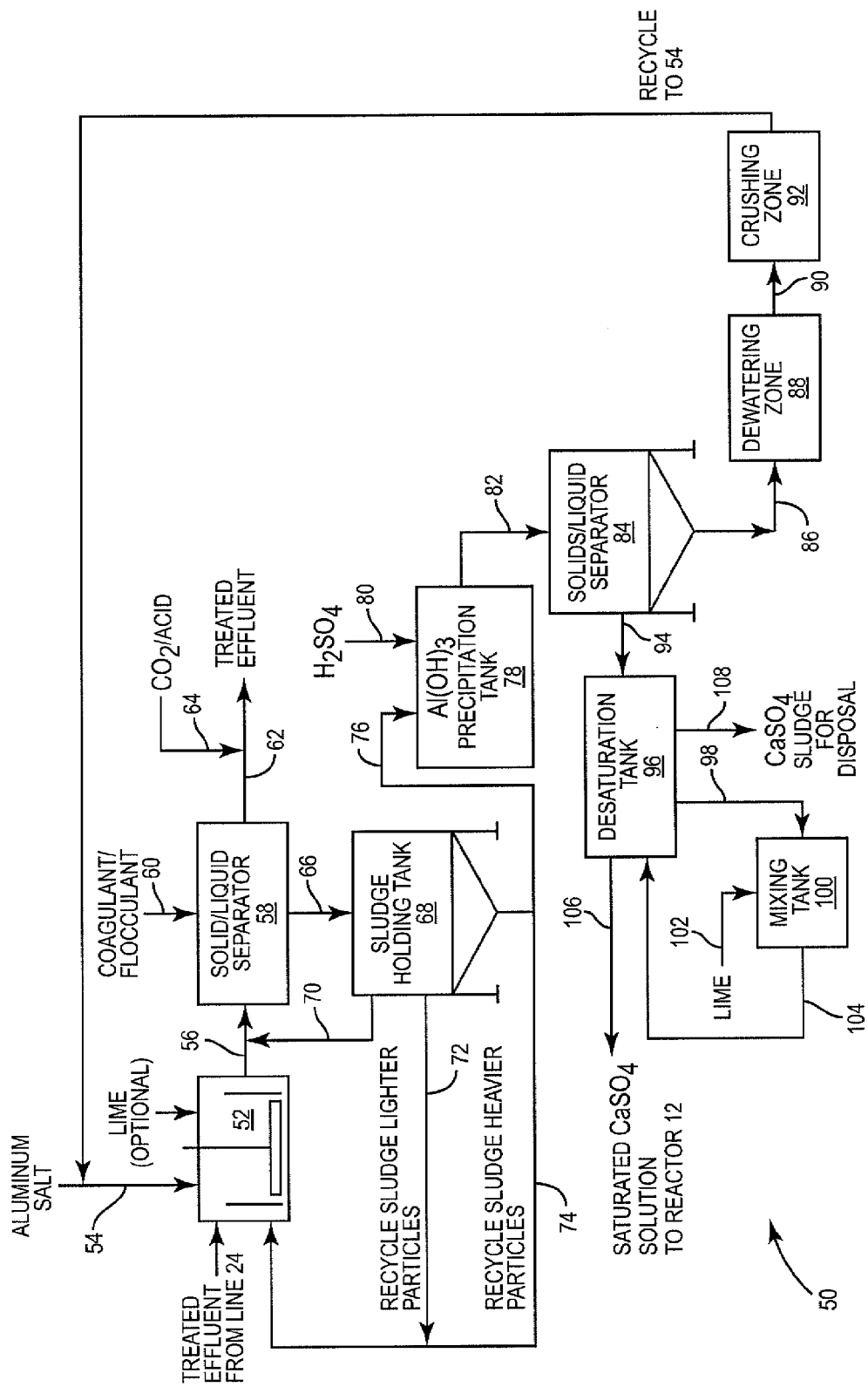
FIG. 2 is a schematic illustrating another embodiment of the present invention.

In another embodiment, shown in FIG. 2, the treated effluent exiting the solid/liquid separator 20 through line 24 forms an influent stream that is directed to system 50 for further treatment. As mentioned above, all of the dissolved calcium and sulfate ions are not precipitated in the process described in FIG. 1. Accordingly, the influent stream directed to system 50 contains some dissolved calcium and sulfate ions. In the embodiment shown in FIG. 2, the influent stream containing dissolved calcium and sulfate ions is directed from line 24 to reactor 52. In one embodiment, the reactor is the Veolia Water proprietary TURBOMIX reactor. In other embodiments, the reactor is a conventional reactor such as a completely mixed reactor or a continuous flow stirred tank reactor. The influent stream is mixed in reactor 52 with an aluminum salt which is added to the reactor 52 through inlet 54. The addition of aluminum to the influent stream containing dissolved calcium sulfate promotes the precipitation of calcium sulfoaluminate. Aluminum salt added to reactor 52 can be aluminum hydroxide, calcium aluminate, hydrated calcium aluminate, a combination of aluminum chloride with lime or sodium hydroxide, or any combination of chemicals that form aluminum hydroxide.

The influent stream containing precipitated calcium sulfoaluminate is directed from reactor 52 to a solid/liquid separator 58 through line 56. In one embodiment, the solid/liquid separator is the Veolia Water proprietary MULTIFLO system. In other embodiments, the solid/liquid separator is a conventional clarifier or membrane separation unit, for example. The solid/liquid separator 58 separates the calcium sulfoaluminate precipitants from a treated effluent. In the embodiment shown in FIG. 2, coagulant and/or flocculant are added to the influent stream in the separator 58 through inlet 60. The coagulant and/or flocculant promote the agglomeration and settling of the solids in the influent stream. Precipitated calcium sulfoaluminate solids in the solid/liquid separator 58 form sludge that settles to the bottom of the tank. The treated effluent is directed from an upper portion of the solid/liquid separator 58 and exits the solid/liquid separator 58 through outlet 62. The pH of the treated effluent can be adjusted by adding a pH adjustment source, such as carbon dioxide or acid, to the treated effluent through inlet 64. The sludge is directed from the bottom of the solid/liquid separator 58 through line 66 to a sludge holding tank 68 for further settling. Heavier calcium sulfoaluminate precipitants, having a larger particle diameter, settle at the bottom of the sludge holding tank 68. Lighter calcium sulfoaluminate precipitants, having a smaller diameter and a higher surface area, are disposed in an intermediate portion of the sludge holding tank 68. An aqueous supernatant, containing little or no suspended calcium sulfoaluminate particles, is formed in the upper portion of the sludge holding tank 68.

The aqueous supernatant, disposed in the upper portion of the sludge holding tank 68, is recycled from the sludge holding tank 68 to the solid/liquid separator 58 through line 70. This allows any remaining suspended solids in the supernatant to be further exposed to a coagulant and/or flocculant so that the remaining suspended solids can be removed from the system 50 as treated effluent. A portion of the sludge containing lighter calcium sulfoaluminate precipitants is recycled from the sludge holding tank 68 to reactor 52 through line 72, while a portion of the sludge containing heavier calcium sulfoaluminate precipitants is recycled from the sludge holding tank 68 to the reactor 52 through line 74. Both the lighter and heavier calcium sulfoaluminate precipitants are recycled to reactor 52 to maintain a predetermined mass ratio of solids in the reactor 52. As used in the context of reactor 52, the mass ratio is the weight of the calcium sulfoaluminate solids generated from the recycled sludge compared to the weight of the newly precipitated calcium sulfoaluminate solids generated in the influent stream during the precipitation reaction. Typically the mass ratio is between 5:1 and 30:1.

In the embodiment shown in FIG. 2, a portion of the sludge containing heavier calcium sulfoaluminate precipitants are directed from the sludge holding tank 68 to an aluminum hydroxide precipitation tank 78 through line 76. An acid, such as sulfuric acid, is added to the sludge in the aluminum hydroxide precipitation tank 78 through inlet 80. The addition of the acid to the sludge reduces the pH of the sludge to between approximately 6.0 and approximately 6.5. Under these conditions, the calcium sulfoaluminate precipitants in the sludge dissolve and aluminum hydroxide precipitates. The sludge which is supersaturated in dissolved calcium sulfate and which contains aluminum hydroxide precipitates is directed from the aluminum hydroxide precipitation tank 78 to a solid/liquid separator 84 through line 82. The solid/liquid separator 84 separates the precipitated aluminum hydroxide from a supersaturated calcium sulfate effluent. The precipitated aluminum hydroxide is then directed from the solid/liquid separator 84 to a dewatering zone 88 through line 86. After the aluminum hydroxide has been dewatered, it is directed from the dewatering zone 88 to a crushing zone 92 through line 90. The dewatered and crushed aluminum hydroxide can be recycled and reused in the reactor 52.

The supersaturated calcium sulfate effluent is directed from the solid/liquid separator 84 to a desaturation tank 96 through line 94. A portion of the calcium sulfate sludge in the desaturation tank 96 may be wasted through line 108 for off site disposal. Another portion of the calcium sulfate sludge in the desaturation tank 96 is directed to a mixing tank 100 through line 98. Lime is added to the mixing tank 100 through inlet 102 and mixed with the dissolved calcium sulfate therein. The calcium sulfate sludge that has been mixed with lime in mixing tank 100 is recycled to the desaturation tank 96 through line 104. The addition of calcium ions from the lime increases the precipitation reaction of calcium sulfate in the desaturation tank 96 and forms a saturated solution of calcium sulfate. A portion of the saturated solution of calcium sulfate can be recycled from the desaturation tank 96 to reactor 12 through line 106.

Typically, the process described above in FIG. 1 produces a treated effluent exiting the solid/liquid separator 20 having a dissolved calcium sulfate concentration between approximately 2000 mg/L to 2200 mg/L, or approximately 100-110% of the theoretical saturation value. For example, in one experimental test using the approach described in reference to FIG. 1, the concentration of dissolved sulfate ions in the membrane reject stream was reduced from 3500 mg/L to 1320 mg/L within 25 minutes of reaction. A 1320 mg/L soluble sulfate ion concentration corresponds to approximately 1870 mg/L of calcium sulfate in solution, which is close to 100% theoretical solubility of calcium sulfate. Throughout the testing, the lighter and heavier calcium sulfate precipitants were recycled to the reactor 12 such that a mass ratio of approximately 10:1 (mass of precipitated calcium sulfate in the recycled streams compared to the mass of the newly precipitated calcium sulfate in the wastewater stream) was maintained therein. Data from other experimental tests are shown below in Tables 1 and 2.

TABLE 1

| | | | |
|---|---|---|---|
| Mass Ratio Maintained in the Precipitation Reactor | 20:1 | 15:1 | 10:1 |
| pH of the Treated Effluent | 9.3 | 9.3 | 9.2 |
| Sulfate Concentration in the Treated Effluent (mg/L) | 1350 | 1100 | 1200 |
| Calcium Concentration in the Treated Effluent (mg/L) | 790 | 810 | 820 |

Table 1 illustrates the calcium sulfate precipitation in the approach described in reference to FIG. 1. In this embodiment, an aqueous stream having a sulfate concentration of 3200 mg/L was mixed in a precipitation reactor with lime, calcium chloride, and 30 g/L of calcium sulfate hemihydrates as seed material. After a 30 minute reaction period in the precipitation reactor, the treated aqueous stream was directed to a solid/liquid separator. The testing was conducted at various mass ratios ranging between 10:1 and 20:1. After solid/liquid separation, the dissolved sulfate and calcium concentrations in the treated effluent were analyzed. Under these conditions, the dissolved sulfate concentration was reduced from 3200 mg/L to between 1100 mg/L and 1350 mg/L, which is less than the theoretical solubility limit of calcium sulfate (1800 mg/L as sulfate).

TABLE 2

| | |
|---|---|
| Mass Ratio Maintained in the Precipitation Reactor | 15:1 |
| pH of the Treated Effluent | 12 |
| Sulfate Concentration in the Treated Effluent (mg/L) | 1100 |

Table 2 also illustrates the calcium sulfate precipitation in the approach described in reference to FIG. 1. In this embodiment, an aqueous stream having a sulfate concentration of 3200 mg/L was mixed in a precipitation reactor with lime and 30 g/L of calcium sulfate hemihydrates as seed material. Note that in this embodiment, no calcium chloride was added to the precipitation reactor. After a 30 minute reaction period in the precipitation reactor, the treated aqueous stream was directed to a solid/liquid separator. Testing was conducted at a mass ratio of 15:1. After solid/liquid separation, the dissolved sulfate and calcium concentrations in the treated effluent were analyzed. Under these conditions, the dissolved sulfate concentration was reduced from 3200 mg/L to 1100 mg/L.

Typically, the process described above in FIG. 2 produces a treated effluent exiting the solid/liquid separator 58 having a dissolved calcium sulfate concentration of less than 100 mg/L. For example, in one experimental test using the approach described in reference to FIG. 2, the concentration of dissolved sulfate ions in the treated effluent from line 24 was reduced from 1500 mg/L to less than 100 mg/L within 30 minutes of reaction. Throughout the testing, the lighter and heavier calcium sulfoaluminate precipitants were recycled to the reactor 52 such that a mass ratio of approximately 10:1 (mass of precipitated calcium sulfoaluminate in the recycled streams compared to the mass of the newly precipitated calcium sulfoaluminate in the treated effluent) was maintained therein.

Figure 3:
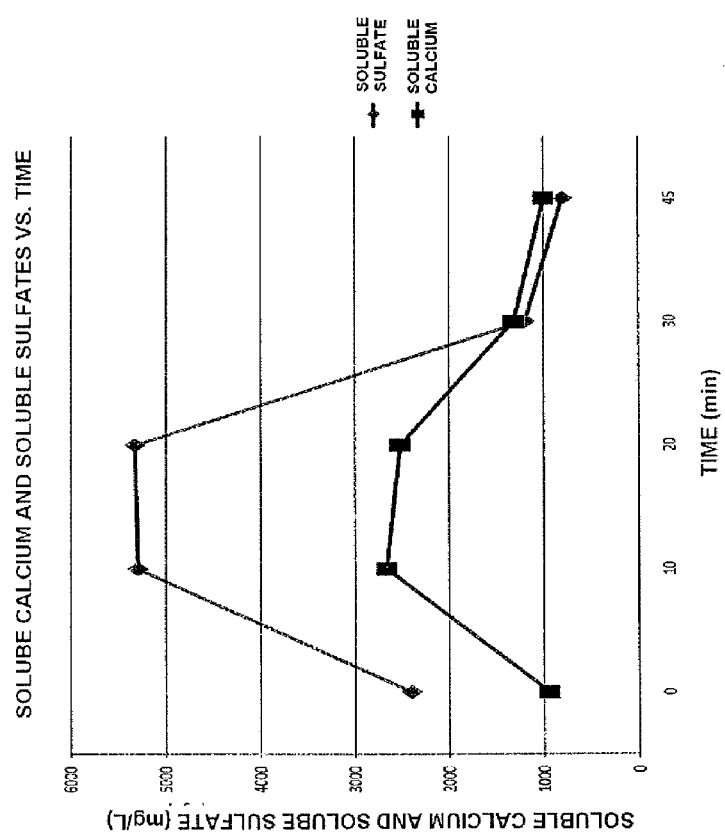
FIG. 3 is a graph illustrating calcium sulfate precipitation kinetics.

FIG. 3 illustrates a summary of exemplary data obtained for calcium sulfate precipitation kinetics. In this embodiment a wastewater stream having a sulfate concentration of approximately 2400 mg/L was mixed with lime, calcium chloride, and 30 g/L of calcium sulfate hemihydrates as a seed material. The sample was mixed thoroughly. At definite time intervals, a portion of the sample was collected and filtered through 0.45 μm filter to separate solids from the solution. After filtration the solution was analyzed to determine the calcium and sulfate concentrations therein. As the graph in FIG. 3 illustrates, the concentration of dissolved sulfate increased from 2400 mg/L to 5300 mg/L and the concentration of dissolved calcium increased from 945 mg/L to 2500 mg/L within the first 20 minutes of the reaction. However, the concentrations of these solutes decreased sharply after approximately 30 minutes of the reaction. As shown in the graph, after 30 minutes of reaction, the concentration of dissolved sulfate was reduced to approximately 1200 mg/L and the concentration of dissolved calcium was reduced to approximately 1300 mg/L. Further reduction of both solutes was achieved after 45 minutes of reaction.

The present invention is not limited to the above summary of features and advantages. Indeed, those skilled in the art will recognize additional features and advantages upon reading the following detailed description, and upon viewing the accompanying drawings.

The invention claimed is:

1. A method for reducing a sulfate concentration in wastewater stream comprising:
   directing a wastewater stream containing sulfate ions through a membrane and producing a membrane permeate stream and a membrane reject stream, the membrane reject stream containing sulfate ions;
   directing the membrane reject stream containing sulfate ions to a first precipitation reactor;
   adding a calcium source and a calcium salt seed material to the precipitation reactor, wherein the calcium salt seed material comprises calcium sulfate hemihydrates;
   mixing the membrane reject stream, the calcium source, and the calcium salt seed material in the precipitation reactor;
   precipitating calcium sulfate in the precipitation reactor and adsorbing sulfate ions in the membrane reject stream onto the precipitated calcium sulfate and onto the calcium salt seed material to form a treated reject stream containing the precipitated calcium sulfate with adsorbed sulfate ions;
   directing the treated reject stream to a first solid-liquid separator and separating the precipitated calcium sulfate from the treated reject stream and forming a first treated effluent;
   directing the precipitated calcium sulfate to a first settling tank, settling the precipitated calcium sulfate in the settling tank, and forming a supernatant in the settling tank;
   wherein settling the precipitated calcium sulfate in the settling tank further comprises settling heavier calcium sulfate precipitants having a larger particle diameter to the bottom of the settling tank and settling the lighter calcium sulfate precipitants having a smaller particle diameter to an intermediate portion of the settling tank;
   recirculating the precipitated calcium sulfate from the settling tank to the precipitation reactor;
   wherein recirculating the precipitated calcium sulfate comprises separately recirculating a portion of the lighter calcium sulfate precipitants from a portion of the heavier calcium sulfate precipitants to the precipitation reactor;
   directing the first treated effluent stream from the first solid-liquid separator to a second precipitation reactor;
   adding an aluminum salt to the second precipitation reactor;
   mixing the first treated effluent stream and the aluminum salt in the second precipitation reactor;
   precipitating calcium sulfoaluminate in the second precipitation reactor to form a second treated effluent stream containing precipitated calcium sulfoaluminate;
   directing the second treated effluent stream containing precipitated calcium sulfoaluminate to a second solid-liquid separator and separating the precipitated calcium sulfoaluminate from the second treated effluent stream and forming a third treated effluent stream;
   directing the precipitated calcium sulfoaluminate to a second settling tank, settling the precipitated calcium sulfoaluminate in the second settling tank; and
   recirculating the precipitated calcium sulfoaluminate from the second settling tank to the second precipitation reactor.

2. The method of claim 1 wherein the supernatant contains some precipitated calcium sulfate and wherein the method further comprising recycling the supernatant from the settling tank to the first solid-liquid separator and separating the precipitated calcium sulfate from the supernatant.

3. The method of claim 1 further comprising directing another portion of the heavier calcium sulfate precipitants to a dewatering zone.

4. The method of claim 1 further comprising maintaining a predetermined mass ratio of solids in the first precipitation reactor, the mass ratio being the ratio of the weight of the recirculated precipitated calcium sulfate disposed in the first precipitation reactor to the weight of newly precipitated calcium sulfate in the treated water stream disposed in the precipitation reactor.

5. The method of claim 4 wherein the mass ratio is in the range between 5:1 and 30:1.

6. The method of claim 1 wherein the calcium source comprises lime, calcium chloride, or a combination of lime and calcium chloride.

7. The method of claim 1 wherein the treated reject stream has a concentration of dissolved calcium sulfate approximately equal to the theoretical saturation value of calcium sulfate in the treated reject stream.

8. The method of claim 1 wherein the membrane reject stream has a concentration of dissolved sulfate ions of approximately 3500 mg/L or more.

9. The method of claim 1 wherein mixing occurs for approximately 25 minutes and wherein after mixing for approximately 25 minutes the treated water stream has a concentration of dissolved sulfate ions of approximately 1320 mg/L and a concentration of dissolved calcium sulfate of approximately 1870 mg/L.

10. The method of claim 1 wherein settling the precipitated calcium sulfoaluminate in the second settling tank further comprises settling heavier calcium sulfoaluminate precipitants having a larger particle diameter to the bottom of the second settling tank and settling the lighter calcium sulfoaluminate precipitants having a smaller particle diameter to an intermediate portion of the second settling tank.

11. The method of claim 10 wherein recirculating the precipitated calcium sulfoaluminate comprises separately recirculating a portion of the lighter calcium sulfoaluminate precipitants from a portion of the heavier calcium sulfoaluminate precipitants.

12. The method of claim 4 wherein the predetermined mass ratio is a first predetermined mass and the method further comprises maintaining a second predetermined mass ratio of solids in the second precipitation reactor and wherein the second predetermined mass ratio is the ratio of the weight of recirculated precipitated calcium sulfoaluminate disposed in the second precipitation reactor to the weight of newly precipitated calcium sulfoaluminate in the first treated effluent stream disposed in the second precipitation reactor.

13. The method of claim 12 wherein the second predetermined mass ratio is in the range between 5:1 and 30:1.

14. The method of claim 11 further comprising directing another portion of the heavier calcium sulfoaluminate precipitants to an aluminum hydroxide precipitation reactor.

15. The method of claim 14 further comprising adding an acid to the aluminum hydroxide precipitation reactor and mixing the acid with the calcium sulfoaluminate precipitants disposed in the aluminum hydroxide precipitation reactor and dissolving calcium sulfate while precipitating aluminum hydroxide.

16. The method of claim 15 further comprising directing the dissolved calcium sulfate and precipitated aluminum hydroxide to a third solid-liquid separator and separating the dissolved calcium sulfate from the precipitated aluminum hydroxide.

17. The method of claim 16 further comprising recirculating the separated aluminum hydroxide from the third solid-liquid separator to the second precipitation reactor.

18. The method of claim 16 further comprising mixing lime with the dissolved calcium sulfate to form a saturated calcium sulfate solution and directing the saturated calcium sulfate solution to the first precipitation reactor.

* * * * *